US008457418B2

(12) United States Patent
Jerdev

(10) Patent No.: US 8,457,418 B2
(45) Date of Patent: Jun. 4, 2013

(54) LOCAL AREA CONTRAST ENHANCEMENT

(75) Inventor: Dmitri Jerdev, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 37 days.

(21) Appl. No.: 13/196,681

(22) Filed: Aug. 2, 2011

(65) Prior Publication Data
US 2013/0034307 A1 Feb. 7, 2013

(51) Int. Cl.
*G06K 9/36* (2006.01)
*G06K 9/40* (2006.01)

(52) U.S. Cl.
USPC .............................. 382/232; 382/262; 382/263

(58) Field of Classification Search
USPC ................. 382/128–132, 254, 260–264, 266, 382/274, 168–172; 358/80, 39, 76, 40
See application file for complete search history.

(56) References Cited

U.S. PATENT DOCUMENTS

| | | | | | |
|---|---|---|---|---|---|
| 5,012,333 | A | * | 4/1991 | Lee et al. ....................... | 358/520 |
| 5,357,549 | A | * | 10/1994 | Maack et al. ................... | 378/62 |
| 5,978,518 | A | | 11/1999 | Oliyide | |
| 5,995,656 | A | | 11/1999 | Kim | |
| 6,137,533 | A | * | 10/2000 | Azim .......................... | 348/222.1 |
| 6,285,798 | B1 | * | 9/2001 | Lee ............................... | 382/260 |
| 7,072,524 | B1 | * | 7/2006 | Yamada ........................ | 382/260 |
| 7,315,656 | B2 | * | 1/2008 | Von Thal et al. .............. | 382/254 |
| 2008/0019600 | A1 | * | 1/2008 | Takita et al. .................. | 382/254 |
| 2008/0019608 | A1 | * | 1/2008 | Zuro ............................. | 382/274 |

OTHER PUBLICATIONS

Tomasi, C.; Manduchi, R.; , "Bilateral filtering for gray and color images," Computer Vision, 1998. Sixth International Conference on , vol., no., pp. 839-846, Jan. 4-7, 1998.*
"JPEG 2000," from Wikipedia, the free encyclopedia, http://www.en.wikipedia.org/wiki/JPEG_2000, retrieved Jul. 15, 2011, pp. 1-17.
PCT Search Report and Written Opinion of the ISA; dated Oct. 23, 2012; for PCT Pat. App. No. PCT/US2012/042928.
Anonymous: "Bilaterale Filterung", Wikipedia, der freien Enzyklopadie, Jul. 14, 2011; retrieved Sep. 5, 2012, 2 pages.
Alleysson, D. et al.: "HDR CFA image rendering", European Signal Processing Conference Sep. 4-9, 2006, 4 pages.

* cited by examiner

*Primary Examiner* — Vu Le
*Assistant Examiner* — Andrae S Allison
(74) *Attorney, Agent, or Firm* — Daly, Crowley, Mofford & Durkee, LLP

(57) ABSTRACT

A method includes receiving image data, generating a low-pass image and a high-pass image from the image data, applying dynamic range compression to the low-pass image and not the high-pass image, and adding the high-pass image to the low-pass image after dynamic range compression to create an output image.

19 Claims, 3 Drawing Sheets

LOCAL AREA CONTRAST ENHANCEMENT

FIELD OF THE INVENTION

This disclosure relates in general to image processing and, more particularly, to techniques improving contrast enhancement.

BACKGROUND

Infrared (IR) imaging is used today in a variety of applications. For instance, law enforcement groups and militaries often use IR imaging to find persons or other targets in low-light conditions. IR imaging is also used in industrial applications to provide information about heat production and transfer in manufacturing processes.

A typical IR image device may receive an input with a very high dynamic range. In the context of IR imaging, a dynamic range may be a function of a temperature difference among multiple objects in a scene. If all of the objects are very close in temperature, then the dynamic range may be relatively low. On the other hand, if the temperature difference is large (e.g., if ice water and a hot soldering iron are in the same scene), the dynamic range may be relatively high.

Many conventional displays only have a finite number of different colors or shades that may be used to represent temperature difference within a scene. Thus, a conventional display may not be able to display a scene with a high dynamic range if the dynamic range is treated linearly.

There are a number of range compression algorithms currently available. For instance, compression using Naka-Rushton equation is commonly used in high dynamic range imagery monitors. Dynamic range compression can be applied to a scene; however, such dynamic range compression may (and often does) cause a loss of detail in the scene that is noticeable to a human user. In some instances, the loss of detail may be acceptable, but in other instances, it may be desirable to preserve the detail.

SUMMARY

According to one embodiment, a method includes receiving image data, generating a low-pass image and a high-pass image from the image data, applying dynamic range compression to the low-pass image and not the high-pass image, and adding the high-pass image to the low-pass image after dynamic range compression to create an output image.

According to another embodiment, an image processing system includes a transducer unit receiving light and producing image data representing a scene, a frequency filter unit generating a low-pass image and a high-pass image from the image data, a dynamic range compression unit that performs dynamic range compression on the low-pass image, a combining unit that combines the high-pass image with the low-pass image after dynamic range compression to produce a combined image, and a user interface unit adapted to render a view of the scene.

According to yet another embodiment, a computer program product having a computer readable medium tangibly recording computer program logic for providing local contrast enhancement, the computer program product including code to apply a frequency filter to received image data to generate a first frequency component image and a second frequency component image, code to perform a dynamic range compression on the first frequency component image but not the second frequency component image, and code to generate a combined image that includes the second frequency component image and a dynamic-range-compressed first frequency component image.

BRIEF DESCRIPTION OF THE DRAWINGS

A better understanding of the present invention will be realized from the detailed description that follows, taken in conjunction with the accompanying drawings, in which.

DETAILED DESCRIPTION

Various embodiments provide techniques to enhance visible details in an image processing system. One specific example involves an IR image processing system, though the scope of embodiments includes any kind of image processing system (e.g., visible light image processing system, ultraviolet (UV) image processing system, radar image processing systems, etc.).

In this example embodiment, a light sensing device, such as an IR video camera, receives an image of a scene. The light sensing device converts the light into analog or digital signals that are indicative of the scene. The signals include the original image data and may be referred to in FIG. 1 as the original input image.

The original input image is input to a Low-Pass Filter (LPF), which generates a low-pass image from the original input image. The system also generates a high-pass image. The low-pass image is then subjected to dynamic range compression, which the high-pass image bypasses. Thus, only one of the two frequency component images is dynamic range compressed.

The present embodiment assumes that the fine details in the image are included in the high-pass image, whereas the low-pass image includes larger features shown more coarsely within a larger dynamic range. By subjecting only the low-pass image to dynamic range compression, the example embodiment preserves the fine details while, at the same time, applying appropriate range compression.

The compressed low-pass image and the high-pass image are then combined to create an output image. Further processing may include actually displaying the image on a user interface device, such as a Liquid Crystal Display (LCD), a Light-Emitting Diode (LED) display, and/or the like.

Various embodiments further include a processor-based system to implement the device discussed above. For instance, some embodiments include a processor that executes computer code to perform the filtering, compressing, adding, and other functions that make up the image processing technique. Other embodiments may be implemented in hardware or a combination of hardware and software. Further embodiments include the image processing and display methods.

The above-identified example embodiments are for illustration purposes only, and the scope of embodiments is not limited to the details described above. The following figures are used to describe example embodiments in more detail.

Figure 1:
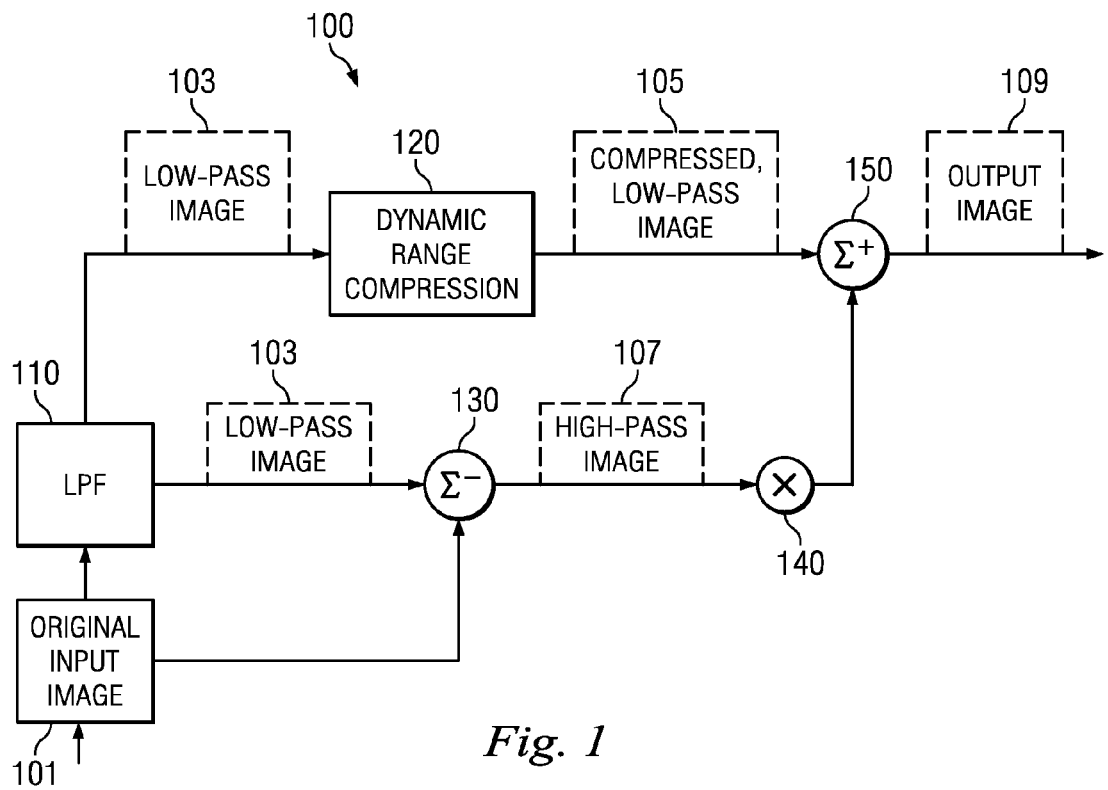
FIG. 1 is an illustration of an exemplary process for processing an image, according to one embodiment.

FIG. 1 is an illustration of exemplary process 100, adapted according to one embodiment. Process 100 may be performed by one or more hardware and/or software modules in an image processing system, where such modules may execute computer-readable code (e.g., software or firmware) providing functionality described herein.

Original input image 101 is received, e.g., from an IR image capturing device, such as a camera. Original input image 101 is in either analog or digital form, but in many embodiments will be digitized to facilitate processing. Further in this example, original input image 101 has a high-dynamic range as a result of objects of very different being temperatures included in the scene. For instance, the scene may include objects that vary by hundreds or thousands of degrees Celsius, and the collection of objects may be skewed toward the high-end or low-end of the temperature range rather than distributed evenly over the temperature range.

Accordingly, it may be desired to perform a non-linear dynamic range compression on the original input image 101 to facilitate a meaningful output that represents the objects in the scene according to their respective temperatures. Also, it may be desired to provide the dynamic range compression without a substantial loss of detail.

In block 110, original image data 101 is input to a low-pass filter, which produces low-pass image 103. Various embodiments may use any type of low-pass filter that is appropriate. In one example, a low-pass filter processes the original image pixel-by-pixel with a smoothing algorithm.

Figure 2:
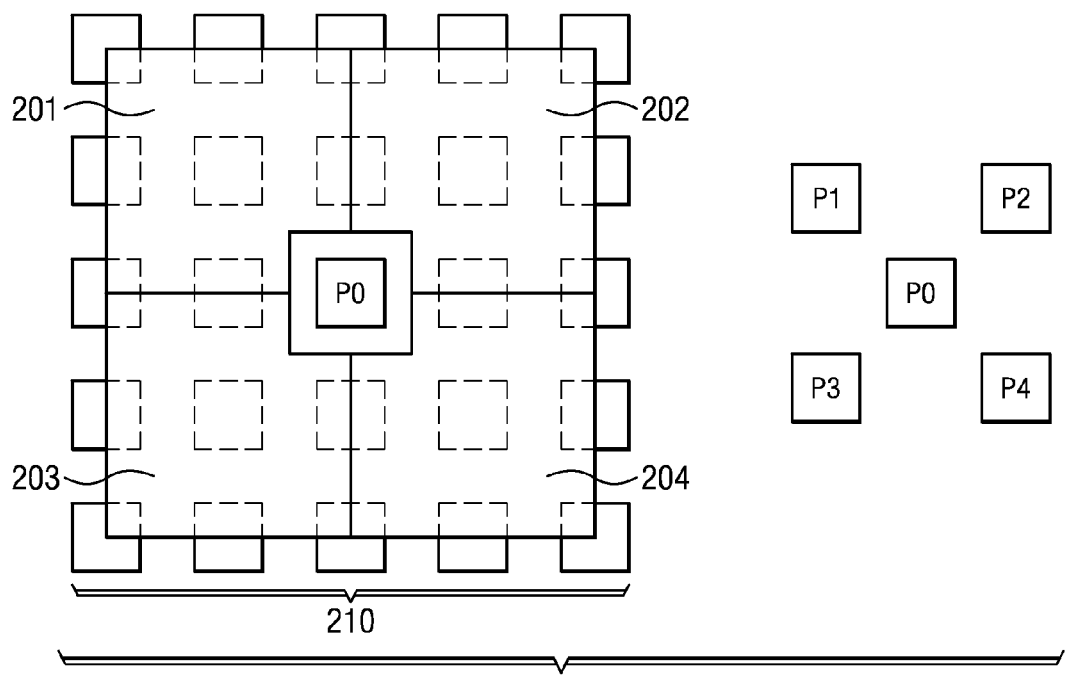
FIG. 2 is an illustration of an exemplary low-pass filtering operation, according to one embodiment.

FIG. 2 is an illustration of an exemplary low-pass filtering operation adapted according to one embodiment. For a given pixel P0, a low pass filter creates an N×N kernel, in this example, a 5×5 kernel 210. The low-pass filtering operation provides for a smoothing operation that applies an averaging algorithm to P0 depending on its neighbors in the N×N kernel.

In this particular example, the 5×5 kernel is divided into four quadrants 201-204. The pixels in quadrant 201 are averaged to generate virtual pixel P1. Similarly, the pixels in quadrants 202-204 are averaged to generate virtual pixels P2-P4, respectively.

The filtering process continues by calculating weights for each of the virtual pixels P1-P4. In this example, the weight of a virtual pixel is calculated based on a difference in pixel value between the particular virtual pixel and P0. The greater the difference, the smaller the weight. Then, a new value for P0 is calculated using Equation 1

$$P0 = \text{sum}(Wi * Pi)/\text{sum}(Wi),\qquad \text{Eq. (1)}$$

where Wi is a weight for a particular virtual pixel Pi. The process then moves to the next pixel in the frame and repeats the process. The process continues until all desired pixels in the frame have been smoothed.

Figure 3:
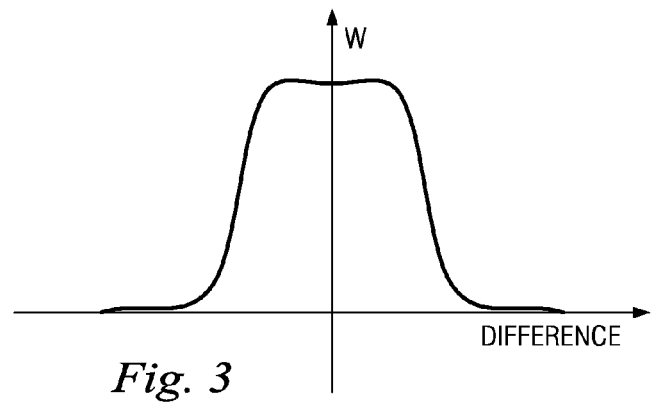
FIG. 3 is an illustration of an exemplary relationship between pixel value and weight in an example low-pass filter, according to one embodiment.

FIG. 3 shows an exemplary relationship between pixel value and weight according to one embodiment. The x-axis is the difference between a virtual pixel and P0, and the y-axis is assigned weight of a virtual pixel. The relationship in FIG. 3 provides that the greater a difference between a virtual pixel and P0, the less weight that is assigned to the virtual pixel. Such relationship may be useful in systems and processes that generate images from data with a high dynamic range. For instance, when an item in a scene is very hot or very cold, pixels around the border of the item may suffer from a blurriness or "halo effect" from being averaged with surrounding unlike pixels. However, the relationship shown in FIG. 3 reduces this edge sensitivity by ensuring that pixels with a large difference from P0 contribute little to the final value for P0 after weighted averaging.

The scope of embodiments is not limited to the exact process described above with respect to FIG. 2. Other embodiments may provide different filtering techniques. For instance, some embodiments may omit the generation of virtual pixels and instead average P0 with each individual pixel in its N×N kernel. Such an approach may add precision to the process, but may also consume more memory and processing power than the embodiment illustrated in FIG. 2. Furthermore, an embodiment that averages the individual pixels in the kernel may have increased flexibility to use other parameters in the assignment of weight. For instance, when some pixels in the process are spatially farther from P0 than other pixels, assigned weight may decrease proportionally with spatial distance. An example filter that uses two parameters for weighting may be referred to as a bilateral filter, though any number of parameters is possible in some embodiments.

Additionally, other embodiments may use kernels of different sizes than 5×5. In fact, any appropriately sized kernel can be used by various embodiments. In general, larger kernels cause a process to consume more memory and processing power but may, in some instances, provide better results.

Returning to FIG. 1, low-pass image 103 is input to subtracting block 130 along with original input image 101 to generate high-pass image 107. FIG. 1 merely shows one way to produce both a high-pass image 107 and a low-pass image 103. In an alternative embodiment, process 100 may include a high-pass filtering block, in parallel with low-pass filtering block 110, to produce high-pass image 107. The scope of embodiments is not limited to any particular technique for generating high-pass image 107 and low-pass image 103.

At block 120, low-pass image 103 is subjected to dynamic range compression. Any of a variety of techniques may be used to provide dynamic range compression. In one specific example, an algorithm based on the Naka-Rushton relationship shown below in Equation 2, is applied pixel-by-pixel to the low-pass image 103.

$$P_{out} = P_{in} * (1 + X_0)/(Pin + X_0),\qquad \text{Eq. (2)}$$

where $P_{in}$ is an input pixel, $P_{out}$ is an output pixel, and $X_0$ is a curvature parameter.

Figure 4:
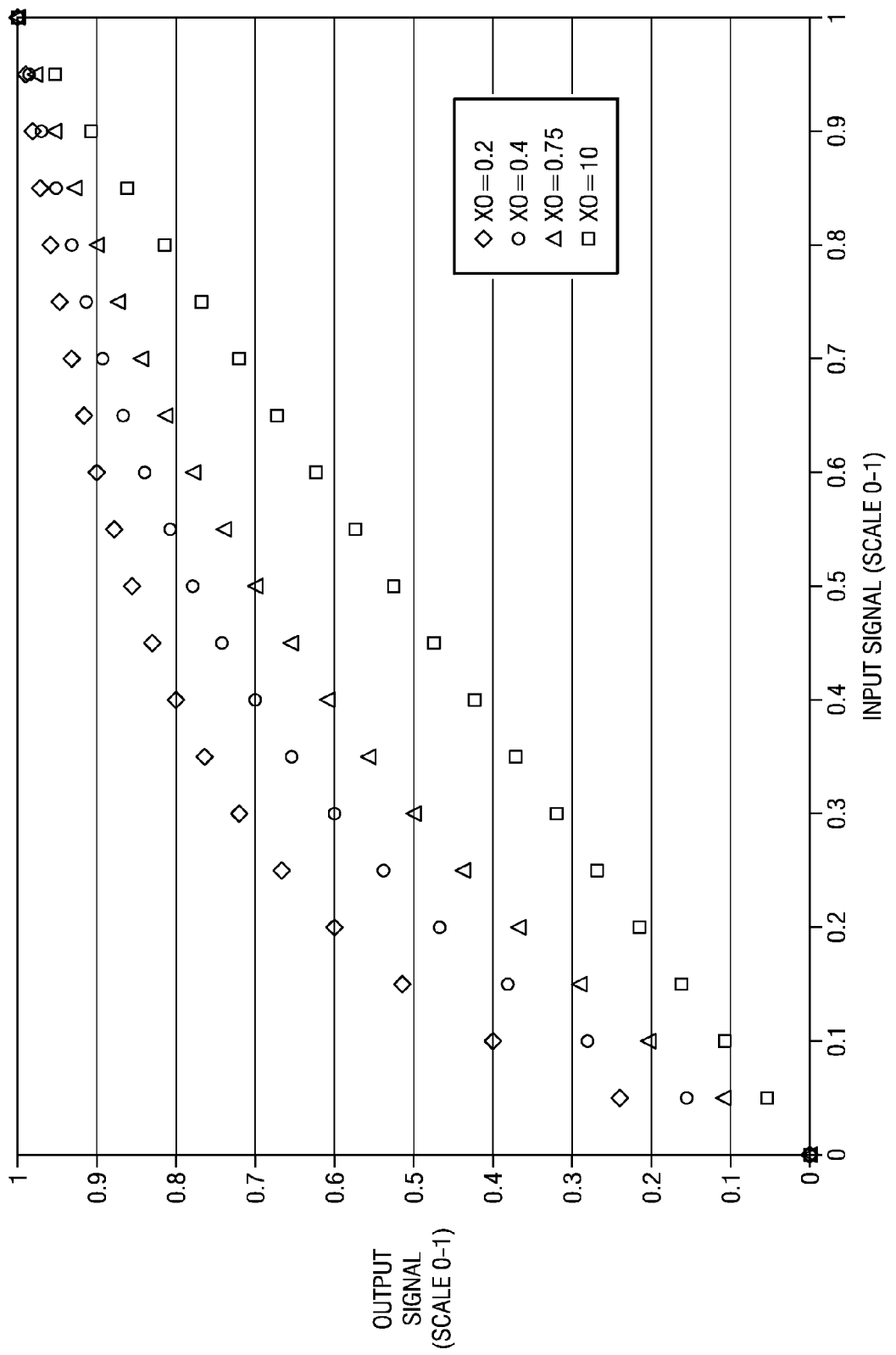
FIG. 4 is an illustration of a graph of an exemplary dynamic range compression algorithm according to one embodiment.

In Equation 2, a smaller value of $X_0$ provides a greater amount of compression. Equation 1 is graphed in FIG. 4 to show how different values of $X_0$ affect the compression applied to a given image. However, it should be noted that the scope of embodiments is not limited to any particular technique for dynamic range compression, as other embodiments may include a modified Naka-Rushton relationship or may use another type of dynamic range compression.

Returning to FIG. 1, block 120 outputs compressed, low-pass image 105, and high-pass image 107 is input to gain block 140. Increasing the gain factor at block 140 may provide a higher level of detail to the high-pass image 107 and, in turn, to the output image 109. Various embodiments provide ways to adjust the output image 109. For instance, some embodiments may allow a user to manually adjust $X_0$ or the contrast gain factor or one or both of such parameters may be automatically adjusted. In fact, some embodiments may provide for real-time manual or automatic adjustment of parameters.

Images 105 and 107 are combined at block 150. In this particular instance, images 105 and 107 are added at block 150 to create combined output image 109. By virtue of the processing described above, output image 109 includes an appropriate amount of dynamic range compression, while still including finer details that might have been lost by conventional systems.

Process 100 is exemplary, and the scope of embodiments is not limited to the exact configuration shown in FIG. 1. Various embodiments may add, omit, rearrange, or modify one or more actions. For example, some embodiments further include a displaying process, wherein the output image 109 is input to a transducer device, such as an LCD, to render image 109 in a form perceptible to a human user. Process 100 does not exclude other image processing techniques, which may be desired or appropriate.

Figure 5:
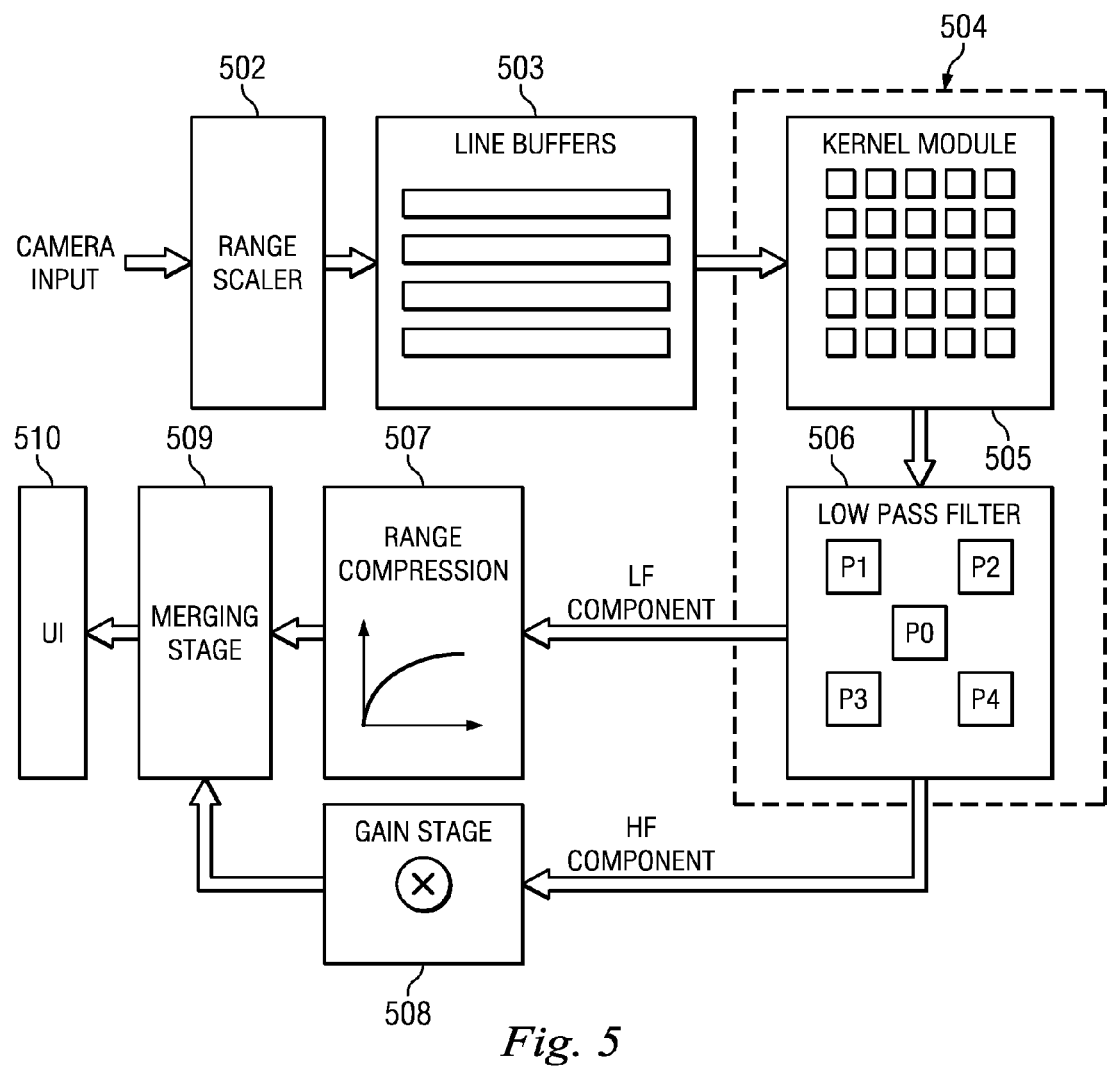
FIG. 5 is an illustration of an exemplary system for processing an image, according to one embodiment.

FIG. 5 is an illustration of an exemplary system 500 for performing process 100. It is understood that some embodiments are implemented in computer executable code (e.g., software, firmware), that is run by a processor device. One embodiment includes a stand-alone imaging device (e.g., a rifle scope, goggles, binoculars, and the like), whereas another embodiment may be run on a special-purpose or general-purpose computer that has an appropriate camera input and display.

When implemented via computer-executable instructions, various elements of some embodiments are in essence the code defining the operations of such various elements. The executable instructions or software/firmware code may be obtained from a tangible readable medium (e.g., a hard drive media, optical media, RAM, EPROM, EEPROM, tape media, cartridge media, flash memory, ROM, memory stick, network storage device, and/or the like). In fact, readable media can include any medium that can store information.

The processing unit may include, for example, a general purpose CPU, which may execute the various logical instructions according to embodiments of the present disclosure. For example, one or more CPUs may execute machine-level instructions according to the exemplary operational flows described above in conjunction with FIG. 1. Moreover, embodiments of the present disclosure may be implemented on application specific integrated circuits (ASICs) digital signal processors (DSPs), or other specialized processing circuits. In fact, persons of ordinary skill in the art may utilize any number of suitable structures capable of executing logical operations according to the embodiments of the present disclosure.

FIG. 5 includes range scaler 502, which receives data from the camera input. Range scaler 502 normalizes the data within a pre-set range, where the lowest pixel value is set to zero, the highest pixel value is set to a pre-set max, and pixel values between are normalized within the range.

Next, the pixel values are loaded into line buffers 503, which are memory devices for video data. Line buffers 503 are implemented in this example as First In First Out (FIFO) buffers, though any type of line buffer now known or later developed may be used in some embodiments.

The line buffers 503 output the pixels to filter 504, which includes kernel module 505 and LPF 506. Kernel module 505 arranges the pixels into kernels, and the LPF 506 performs a smoothing operation (e.g., a weighted average function) on a given pixel based on the other pixels in the kernel. Kernel module 505 and LPF 506 operate pixel-by-pixel so that each pixel is associated with its own kernel and filtered. Some embodiments may filter multiple pixels in parallel if adequate memory and processing resources are provided.

The low-pass image is sent to range compression module 507, and the high-pass image is sent to gain stage module 508. The two images are then combined at merging module 509 by, e.g., adding. The combined image is then sent to User Interface (UI) module where it is displayed to a human user.

Various embodiments include one or more advantages. For instance, some implementations do not perform dynamic range compression on a frequency component that includes finer details. Thus, the finer details are preserved, while another frequency component that includes a high dynamic range is adequately compressed. Therefore, the output image may be displayed on a device with a finite number of colors or brightness levels (by virtue of the dynamic range compression) while still including at least some of the finer details in the scene.

Although selected embodiments have been illustrated and described in detail, it should be understood that a variety of substitutions and alterations are possible without departing from the spirit and scope of the present invention, as defined by the claims that follow.

What is claimed is:

1. A method comprising:
receiving image data;
generating a low-pass image and a high-pass image from the image data;
applying dynamic range compression to the low-pass image and not the high-pass image; and
adding the high-pass image to the low-pass image after dynamic range compression to create an output image,
wherein the dynamic range compression comprises employing the following relationship, where Pin is an input pixel, Pout is an output pixel, and Xo is a curvature parameter:

$$P\text{out}=P\text{in}*(1+Xo)/(P\text{in}+Xo).$$

2. The method according to claim 1, further comprising:
displaying the output image upon a display device.

3. The method according to claim 1, further comprising:
adjusting a contrast gain of the high-pass image before the adding.

4. The method according to claim 1, in which generating the low-pass image comprises:
applying a low-pass filter to the image data.

5. The method according to claim 4, in which the low-pass filter includes at least one of:
an N×N weighted averaging filter, where N is an integer larger than one; and
a bilateral filter.

6. The method according to claim 4 in which the low-pass filter averages a central pixel with a subset of surrounding pixels, further in which the surrounding pixels are weighted according to a respective difference in value between the surrounding pixels and the central pixel.

7. The method according to claim 4 in which the low-pass filter averages a central pixel with a subset of surrounding pixels, further in which the surrounding pixels are grouped into virtual pixels, the virtual pixels being weighted according to a difference in value between the virtual pixels and the central pixel.

8. The method according to claim 4, in which generating the high-pass image comprises:
subtracting the low-pass image from the image data.

9. The method according to claim 1, in which the dynamic range compression is performed pixel-by-pixel to the low-pass image.

10. An image processing system comprising:
a transducer unit receiving light and producing image data representing a scene;
a frequency filter unit generating a low-pass image and a high-pass image from the image data;
a dynamic range compression unit that performs dynamic range compression on the low-pass image, wherein the dynamic range compression unit is configured to employ the following relationship, where Pin is an input pixel, Pout is an output pixel, and Xo is a curvature parameter: Pout=Pin*(1+Xo)/(Pin+Xo);

a combining unit that combines the high-pass image with the low-pass image after dynamic range compression to produce a combined image; and a user interface unit adapted to render a view of the scene.

11. The image processing system according to claim 10, in which the filter frequency unit comprises a low-pass filter that produces the low-pass image and a subtraction unit that subtracts the low-pass image from the image data to produce the high-pass image.

12. The image processing system according to claim 10, in which the low-pass filter averages a central pixel with a subset of surrounding pixels, further in which the surrounding pixels are weighted according to a respective difference in value between the surrounding pixels and the central pixel.

13. The image processing system according to claim 10, in which the low-pass filter averages a central pixel with a subset of surrounding pixels, further in which the surrounding pixels are grouped into virtual pixels, the virtual pixels being weighted according to a difference in value between the virtual pixels and the central pixel.

14. A computer program product having a non-transitory computer readable medium recording computer program logic for providing local contrast enhancement, the computer program product comprising:

code to apply a frequency filter to received image data to generate a first frequency component image and a second frequency component image;

code to perform a dynamic range compression on the first frequency component image but not the second frequency component image in which the dynamic range compression comprises the following relationship, where Pin is an input pixel, Pout is an output pixel, and Xo is a curvature parameter: Pout=Pin*(1+Xo)/(Pin+Xo); and code to generate a combined image that includes a gain-adjusted second frequency component image and a dynamic-range-compressed first frequency component image.

15. The computer program product of claim 14 in which the first frequency component image is a low-pass image, and in which the second frequency component image is a high-pass image.

16. The computer program product of claim 14 further comprising:

code to apply a gain stage to the second frequency component image before combining the first and second frequency component images.

17. The computer program product of claim 14 further comprising:

code to display the combined image at a user interface unit.

18. The computer program product of claim 14 in which the code to apply a frequency filter comprises:

code to average a central pixel with a subset of surrounding pixels, further in which the surrounding pixels are weighted according to a respective difference in value between the surrounding pixels and the central pixel.

19. The computer program product of claim 14 in which the code to apply a frequency filter comprises:

code to average a central pixel with a subset of surrounding pixels, further in which the surrounding pixels are grouped into virtual pixels, the virtual pixels being weighted according to a difference in value between the virtual pixels and the central pixel.

* * * * *